(12) United States Patent
Last et al.

(10) Patent No.: US 7,858,111 B2
(45) Date of Patent: Dec. 28, 2010

(54) BIOACTIVE FIBER PRODUCTS

(75) Inventors: Hartmut Last, Augsburg (DE); Bernd A. Blech, Bobingen (DE); Jörg Dahringer, Bobingen (DE); Stefan Seibel, Maintal (DE)

(73) Assignee: Trevira GmbH, Hattersheim (DE)

( * ) Notice: Subject to any disclaimer, the term of this patent is extended or adjusted under 35 U.S.C. 154(b) by 1201 days.

(21) Appl. No.: 10/474,021

(22) PCT Filed: Mar. 6, 2002

(86) PCT No.: PCT/EP02/02412

§ 371 (c)(1),
(2), (4) Date: Apr. 8, 2004

(87) PCT Pub. No.: WO02/081791

PCT Pub. Date: Oct. 17, 2002

(65) Prior Publication Data

US 2004/0166143 A1    Aug. 26, 2004

(30) Foreign Application Priority Data

Apr. 4, 2001    (DE) ................ 101 16 751

(51) Int. Cl.
*A61K 9/70* (2006.01)
(52) U.S. Cl. .............. 424/443; 424/402; 428/221; 428/297.4; 442/123
(58) Field of Classification Search .............. 424/443
See application file for complete search history.

(56) References Cited

U.S. PATENT DOCUMENTS

| 3,941,752 A | 3/1976 | Kleiner et al. ............. 260/75 P |
| 3,962,194 A | 6/1976 | Bollert et al. ............. 260/75 P |
| 4,033,936 A | 7/1977 | Bollert et al. ............. 260/75 P |
| 4,035,343 A | 7/1977 | Bollert et al. ............. 260/75 P |
| 4,096,208 A * | 6/1978 | Dursch et al. ............. 558/104 |
| 5,296,238 A | 3/1994 | Sugiura et al. ............. 424/604 |
| 6,368,609 B1 * | 4/2002 | Fontenot et al. ............. 424/404 |
| 2003/0073362 A1 * | 4/2003 | Griesbach et al. ............. 442/151 |

FOREIGN PATENT DOCUMENTS

| DE | 2 236 037 | 2/1974 |
| DE | 2 242 002 | 3/1974 |
| DE | 23 28 343 | 1/1975 |
| DE | 23 46 787 | 3/1975 |
| DE | 24 54 189 | 5/1976 |
| DE | 41 06 165 C2 | 9/1992 |
| EP | 116 865 | 8/1984 |
| JP | 07305279 A | 11/1995 |
| JP | 11222723 | 8/1999 |
| JP | 2000234219 | 8/2000 |
| JP | 2000290834 | 10/2000 |
| WO | WO 94/15462 | 7/1994 |

OTHER PUBLICATIONS

International Search Report in PCT/EP02/02412 dated May 26, 2003.
International Preliminary Examination Report in PCT/EP02/02412 dated Jul. 4, 2003.
Written Opinion (German-language) in PCT/EP02/02412 dated Mar. 17, 2003.
"It's Curtains for Microbes", Alfred Dockery, America's Textiles International, vol. 25, No. 12, 1996. p. 118.

* cited by examiner

*Primary Examiner*—Robert A Wax
*Assistant Examiner*—Hasan S Ahmed
(74) *Attorney, Agent, or Firm*—Marshall, Gerstein & Borun LLP

(57) ABSTRACT

The invention relates to a bioactive fiber product that, as a bioactively effective constituent, contains only one polyester fiber, which is largely or exclusively made of a polyester having links, which are condensed therewith and which contain phosphorous. The bioactive fiber products are suited for all textile products for which antibacterial, fungicidal, acaricidal and similar effects are sought.

9 Claims, No Drawings

BIOACTIVE FIBER PRODUCTS

This is the U.S. national phase of International Application No. PCT/EP02/02412 filed Mar. 6, 2002, the entire disclosure of which is incorporated herein by reference.

This invention relates to bioactive fibrous products such as bioactive yarns and textile fabrics such as nonwovens, wovens, knits and the like and also correspondingly made-up articles such as apparel and underwear textiles, sport textiles, home textiles and bedding, hygiene and medical textiles, automotive textiles, food packaging, industrial textiles for building and filtration, diapers, napkins, towels and the like and also specific bioactive filaments or yarns such as for example sutures or tampon retrieval cords.

For an article to be bioactive for the purposes of this invention it has to perform a biologically active function, i.e., have a bactericidal, fungicidal or acaricidal action for example, in short be active against bacteria, mites, fungi, viruses and similar microorganisms.

It is well known to manufacture bioactive fibrous products. For instance, hospital bed curtains which are bioactive in that they have an antimicrobial action are described in America's Textiles International volume 25 (1996), number 12, page 118. The curtains are made from yarns which are based on a fiber blend; the blend contains first a flame-retardant polyester fiber and secondly a cellulose acetate fiber which is antimicrobial by virtue of incorporation of the antimicrobial additive known as Microban B.

These bioactive curtains are disadvantageous in that first they have to be manufactured from a fiber blend and secondly the cellulose acetate fibers have to be separately rendered antimicrobial by addition of an antimicrobial additive.

Moreover, it is not completely avoidable that the antimicrobial agent will become more or less rapidly washed out during laundering, that the agent can also migrate out of the textile and cause allergies in sensitive persons.

Besides, the antibacterial effect diminishes in use.

The Japanese application JP07305279a published Nov. 21, 1995, describes a polyester fiber which has antibacterial properties and can be used accordingly. To create the antibacterial action, this Japanese patent application teaches admixing the polyester with a quaternary ammonium salt of an alkyl phosphate ester.

The polyester which contains the additive contains polymerized phosphorus compounds for flame-retardant properties.

Similarly, products which contain the fibers described there can cause allergies when the admixture migrates out of the fiber, for example when the textile product is worn or else in the laundering thereof.

Even though there are already a whole series of textile bioactive fibrous products, there is still a need for improved bioactive fibrous products.

It is an object of the present invention to provide bioactive fibrous products which are permanently bioactive, whose bioactivity is only minimally reduced by washing and wearing, if at all, which are appreciably less allergenic, if at all, which are simple to produce and have a broad bioactivity spectrum.

This object is surprisingly achieved by bioactive fibrous products which include as a bioactive component polyester fibers which consist exclusively, substantially or partially of a polyester comprising cocondensed phosphorus-containing chain members. Preferably, the bioactive fibrous products as per the invention contain no further bioactive components or additives. Chain member for the purposes of the invention is to be understood as meaning chain members which are disposed in the linear chain of the polymer molecule (longest chain), but also in any side chains and branches present.

The bioactive fibrous products are preferably textile sheetlike structures such as wovens, knits and nonwovens and also apparel and underwear textiles, sport textiles, home textiles and bedding, hygiene and medical textiles, automotive textiles, food packaging, industrial textiles for building and filtration, diapers, napkins, towels and the like and also specific bioactive filaments or yarns such as for example sutures or tampon retrieval cords.

In a particularly advantageous embodiment of the invention, bioactive fibrous products are made-up finished products for hospital operation (curtains and bedding in sick rooms, clothing for physicians and care personnel, OR apparel, towels, jackets for first aiders, dressing material and drapes, covers for patients' wheelchairs, sutures, filters for air conditioners etc.), for veterinary hygiene (including pest control), for workwear in the pharmaceutical and food industry (overalls, underwear, etc.), for household articles for the kitchen and bathroom (shower curtains, bathmats), for hygiene articles such as infant diapers, sanitary napkins, adult diapers, underwear for women who have just given birth and also for sports articles (socks, underwear) and for numerous industrial applications such as for example filters for air conditioners and automobiles. As well as for mass-produced products such as waddings, bedfills and shoe liners, finished products formed from bioactive fibers are also suitable for very demanding applications such as space travel.

The bioactive fibers of which the bioactive fibrous products are constructed can serve as staple fibers, filaments and as monofils for constructing the bioactive fibrous product. It is possible in this connection for the fiber to be constructed entirely from the polyester having the cocondensed phosphorus-containing chain members. But it is also possible to use so-called multicomponent fibers. Multicomponent fibers combine multiple different raw materials in one fiber. Examples are bicomponent fibers which are constructed as core-sheath or side-by-side fibers. One part of side-by-side filaments can consist of the bioactive polyester component and the other of a nonbioactive material such as for example a nonbioactive polyester.

In the case of core-sheath filaments, it is possible to provide the bioactive component in the core or else in the sheath. Core-sheath filaments where the sheath component are the bioactive material are preferred.

Fibers for the purposes of the invention can be staple fibers, filaments and monofils.

In a further embodiment of the invention, the bioactive polyester fibers are used as so-called hybrid fibers or hybrid yarns.

These hybrid fibers or yarns consist of multiple preferably two polymer components, of which one has a melting point which is at least 10° C. lower than the other. It is possible to use the bioactive polyester component as low-melting component or else as higher-melting component.

With these hybrid yarns it is possible to use higher temperatures to cause the lower-melting component to melt, which then acts as a matrix for the higher-melting fibrous component or which, by complete or incipient melting, ensures better integrity in the textile fabric; for example to improve the slip resistance in the case of woven fabrics or the bonding together of the fibers in the case of nonwovens.

For both multicomponent yarns and hybrid yarns, the use of the bioactive polyester component as a low-melting component generally serves to enlarge the surface area by complete or incipient melting, so that the bioactive performance can be improved.

It particularly advantageous to use polyesters where the cocondensed phosphorus-containing chain member is derived from the following components:

Formula 1

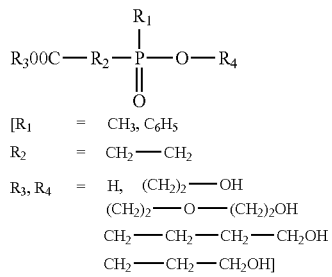

[$R_1$ = $CH_3$, $C_6H_5$
$R_2$ = $CH_2$—$CH_2$
$R_3$, $R_4$ = H, $(CH_2)_2$—OH
  $(CH_2)_2$—O—$(CH_2)_2$OH
  $CH_2$—$CH_2$—$CH_2$—$CH_2$OH
  $CH_2$—$CH_2$—$CH_2$OH]

The polyester may also incorporate internal esters of the formula 2

Formula 2

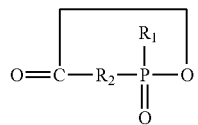

where $R_1$ and $R_2$ are each as defined in the case of formula 1. It will be appreciated that the ring is cleaved in the course of cocondensation. Preferably, $R_1$=$CH_3$.

The production of corresponding polyester fibers in which the polyester comprises cocondensed phosphorus-containing chain members is known per se. Reference is made here to the following German patent applications or patent specifications, the disclosure content of which is hereby expressly incorporated herein:

DE-OS 2 236 037, DE-OS 2 242 002, DE-OS 2 328 00 343, DE-PS 2 346 787, DE-PS 2 454 189.

The fibers described therein have hitherto been used as such only for their flame retardancy. When bioactive fibrous products were to be produced, the only option, as indicated at the beginning for example, was to use an additive which was responsible for the bioactive effects.

It has now been found that, surprisingly, it is possible to produce fibrous products having bioactive effects simply by using as a bioactive component fibers composed of a polyester comprising cocondensed phosphorus-containing chain members.

In a further embodiment of the invention, the polyesters comprising cocondensed phosphorus-containing chain members additionally contain a bioactive additive to broaden the bioactive spectrum especially silver compounds, finely divided metallic silver or additives such as described for example in EP 116 865, WO 94/15462 and DE 4 106 165 or a phosphate glass incorporating silver ions. Such additives are added during polymer production or to the molten polymer.

In an advantageous embodiment, the polyester contains silver metal as an additional additive. In a further particularly preferred embodiment, the elemental silver is present in the form of nanoparticles having a diameter of 1 to 500 nanometers. Nanoparticles having a diameter of 1 to 100 and especially 1 to 10 nanometers are particularly advantageous. Nanoparticles are commercially available.

Of particular advantage for the purposes of the invention are fibrous products which contain bioactive core-sheath fibers where the sheath is the bioactive component. It is possible here to use fibers where the sheath component is 50% based on the area cross-section of the multicomponent fiber and less especially 15-50%, preferably 15-25%.

Fibrous products from multicomponent fibers having a thin sheath are very advantageous. First, these fibers are simple to produce in high quality by melt spinning. Polyester fibers, especially core-sheath fibers, in which exclusively bioactive particles are incorporated and where the polyester does not have any cocondensed chain members are more difficult to process by melt spinning. Secondly, the additional effects which are to be obtained through the addition of bioactive additives are achievable using an appreciably smaller add. For instance, a product as per the invention where the polyester only contains 0.5% of silver zirconium phosphate as additive gives the same bioactive performance as a product which contains 1% of silver zirconium phosphate and no cocondensed phosphate-containing chain members.

The fibrous products are produced by methods which are familiar to one of ordinary skill in the art, i.e., wovens and formed-loop knits are produced using customary machines, nonwovens can be produced for example from staple fibers or from continuous filament fibers here for example by the spun-bond process. Nonwovens, wovens and knits as per the invention can also be processed to form layered products or composites and also to form shaped articles.

It was particularly surprising that it is possible as per the invention to obtain a product which has bioactive effect merely by using polyester fibers which consist of a polyester which comprises cocondensed phosphorus-containing chain members. The view to date was that to obtain a bioactive performance it was necessary to add further additives to the polyester or to incorporate other substances.

The invention makes it possible to produce corresponding bioactive fibrous products simply and quickly. The bioactivity of the products is permanent, it is not reduced by laundering, whether with aqueous systems or else by dry cleaning where organic solvents are used. The cocondensed compounds cannot migrate out and lead to an appreciably lower allergy potential, if any, than is the case with prior art fibrous products.

The following example illustrates the invention:

PET fibers 1.7 dtex 38 mm were ringspun into Nm 50 yarns and processed to form a plain drawn-loop knit. Sample 1 is 100% composed of normal PET. The fibers in sample 2 were admixed with 1% of silver zirconium phosphate in the polymer melt. Sample 3 is 100% composed of fibers of the polyester according to the invention. The three drawn-loop knits were dyed and reduction cleared under the same conditions.

The bioactivity of the samples was determined in accordance with the Japanese standard JISL 1902: 1998 Testing method for antibacterial of textiles. The testing germs used were *Staphylococcus aureus* ATCC 6538P and *Klebsiella pneumoniae* DSM 789.

This method determines after an incubation time of 18 h the difference S=Mb−Mc where S=biostatic value Mb=logarithm of number of active bacteria on unmodified specimen after an incubation time of 18 h Mc=logarithm of number of active bacteria on modified specimen after an incubation time of 18 h The unmodified specimen used was sample 1 composed of 100% normal PET.

The following log reductions S were measured relative to the sample:

|  | Staphylococcus | *Klebsiella pneumoniae* |
| --- | --- | --- |
| Sample 2 | 2.2 | 7.4 |
| Sample 3 | 2.6 | 7.4 |

That is, sample 3 according to the invention exhibited in one case the same and in the second case a superior antimicrobial performance (log reduction) than a conventional antibacterial modified PET fiber.

The invention claimed is:

1. A multi-component fibrous product comprising:
   (a) a core consisting essentially of a non-bioactive polyester; and,
   (b) a sheath surrounding the core, the sheath comprising polyester covalently bonded to co-condensed phosphorus-containing chain members derived from one or more compounds selected from the group consisting of the compound of Formula I and the compound of Formula II:

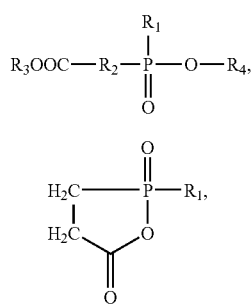

Formula I

Formula II wherein
$R_1$ is $CH_3$ or $C_6H_5$;
$R_2$ is $CH_2$—$CH_2$; and,
$R_3$ and $R_4$ are selected from the group consisting of H, $(CH_2)_2$—OH, $(CH_2)_2$—O—$(CH_2)_2OH$, $CH_2$—$CH_2$—$CH_2$—$CH_2OH$, and $CH_2$—$CH_2$—$CH_2OH$.

2. The multi-component fibrous product of claim 1, wherein the core is selected from the group consisting of fibers, filaments, and monofils.

3. The multi-component fibrous product of claim 2, wherein the core is a fiber.

4. The multi-component fibrous product of claim 1, wherein the product has a cross-sectional area of which 15% to 50% is the sheath.

5. The multi-component fibrous product of claim 4, wherein the product has a cross-sectional area of which 15% to 25% is the sheath.

6. The multi-component fibrous product of claim 1, wherein the core further comprises bioactive additives.

7. The multi-component fibrous product of claim 6, wherein the bioactive additives comprise silver-containing additives.

8. The multi-component fibrous product of claim 7, wherein the silver-containing additives comprise silver zirconium phosphate.

9. A multi-component fibrous product comprising:
   (a) a core consisting of a non-bioactive polyester; and,
   (b) a sheath surrounding the core, the sheath comprising polyester covalently bonded to co-condensed phosphorus-containing chain members derived from one or more compounds selected from the group consisting of the compound of Formula I and the compound of Formula II:

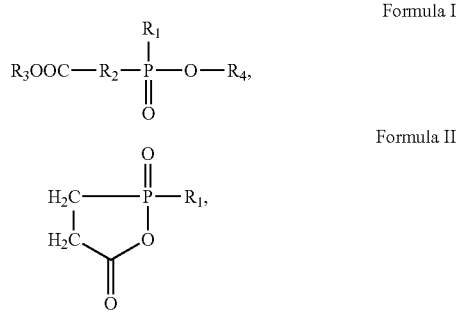

Formula I

Formula II wherein
$R_1$ is $CH_3$ or $C_6H_5$;
$R_2$ is $CH_2$—$CH_2$; and,
$R_3$ and $R_4$ are selected from the group consisting of H, $(CH_2)_2$—OH, $(CH_2)_2$—O—$(CH_2)_2OH$, $CH_2$—$CH_2CH_2$—$CH_2OH$, and $CH_2$—$CH_2$—$CH_2OH$.

* * * * *